C. T. HIBBARD.
ELECTRIC GENERATOR AND MOTOR.
APPLICATION FILED JULY 24, 1908.
957,209.
Patented May 10, 1910.
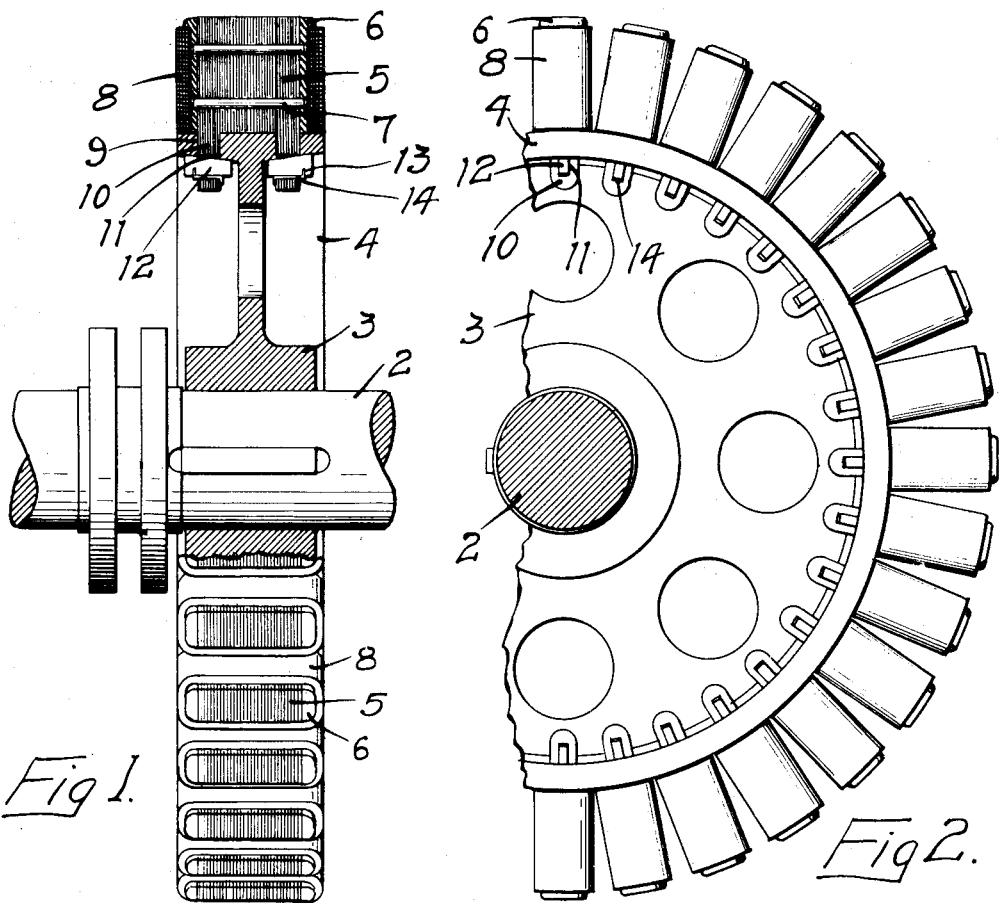
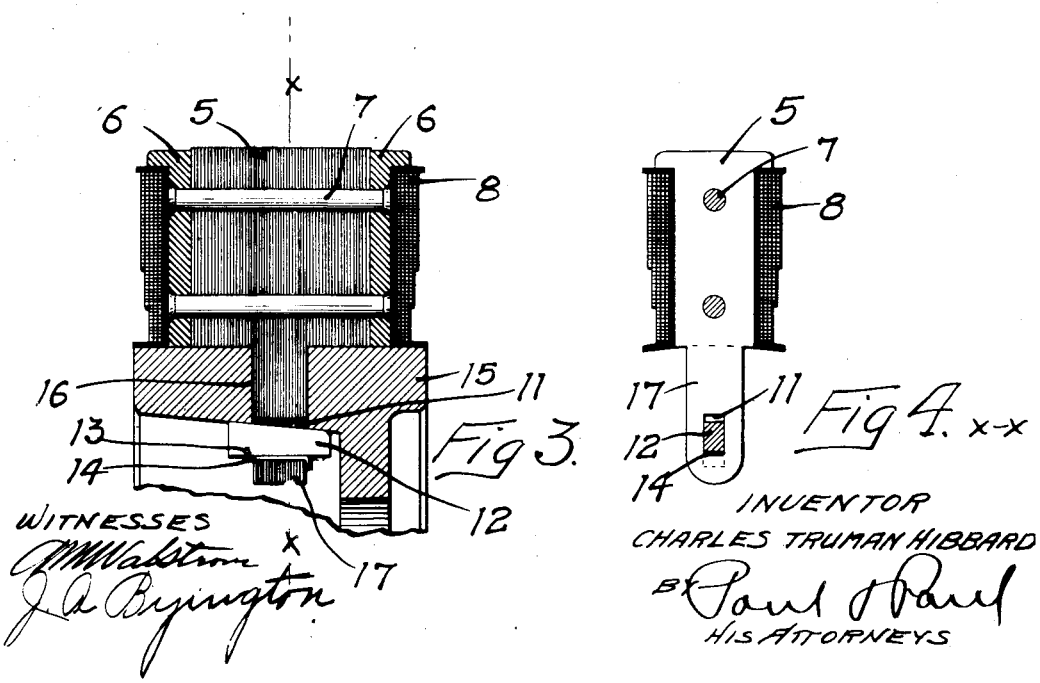
INVENTOR
CHARLES TRUMAN HIBBARD
HIS ATTORNEYS

UNITED STATES PATENT OFFICE.

CHARLES TRUMAN HIBBARD, OF MINNEAPOLIS, MINNESOTA, ASSIGNOR TO ELECTRIC MACHINERY COMPANY, OF MINNEAPOLIS, MINNESOTA, A CORPORATION OF MINNESOTA.

ELECTRIC GENERATOR AND MOTOR.

957,209.  Specification of Letters Patent.  Patented May 10, 1910.

Application filed July 24, 1908. Serial No. 445,148.

*To all whom it may concern:*

Be it known that I, CHARLES TRUMAN HIBBARD, of Minneapolis, Hennepin county, Minnesota, have invented certain new and useful Improvements in Electric Generators and Motors, of which the following is a specification.

The object of my invention, is to provide improved means for and reduce the cost of securing the pole pieces of a generator or motor to the field spider or ring to the end that the pole pieces will be securely held, but be capable of convenient separation from the spider for examination or repairs.

My invention consists generally in providing the pole pieces with tongues fitting within sockets in the field spider and wedges for locking said tongues therein.

In the accompanying drawings forming part of this specification, Figure 1, is an edge view partially in section of a generator spider illustrating the manner of mounting the pole pieces thereon. Fig. 2, is a side view of a portion of the same, Fig. 3, is a sectional view illustrating a slightly modified construction. Fig. 4, is a sectional view on the line $x$—$x$ of Fig. 3.

In the drawing, 2 represents the generator shaft and 3 the field spider keyed thereon and provided with a peripheral rim 4. The pole pieces are seated on this rim and consist of a series of thin plates or laminæ 5 held together between side plates 6 by rivets 7 passing therethrough.

8 represents the field coil windings of the pole pieces. To hold the pole pieces securely in place on the spider and at the same time permit their removal whenever desired, I provide sockets 9 in the rim 4 and form tongues 10 on a series of the plates 5 to fit within said sockets, said tongues having holes 11 therethrough adapted to receive wedges 12, having edges which bear on the tapering inner surface of the rim and draw the pole pieces down snugly against the periphery of the rim. The wedges are provided with notches 13 therein and flat plates 14 fit into the holes 11 and have ends turned outwardly to enter the notches 13 and when adjusted, the opposite ends of the plates are turned inwardly to lock them in the holes in the tongue and prevent the accidental disengagement of the wedges.

In Fig. 3, a modified construction is shown in which the spider 15 has its web located at one side of the center and is provided with a central socket 16 for a single tongue 17 formed on the pole pieces. It will be noted, that only a portion of the pole piece lamina is provided with tongues, those lacking the tongues being securely fastened to those having them by means of the transverse rivets described.

I claim as my invention:

1. In an electric generator or motor, the combination, with a field spider having a solid peripheral rim, and a radial orifice therethrough, of a pole piece having a laminated tongue formed integrally with said pole piece and fitting within and passing through said radial orifice, a wedge fitting within a hole in said tongue and adapted to bear on the inside of said rim and draw the pole piece snugly against the periphery thereof, substantially as described.

2. In an electric generator or motor, the combination, with a field spider having a solid peripheral rim, and a radial orifice therethrough, of a pole piece having a laminated tongue fitting within and passing through said radial orifice, a wedge fitting within the hole in said tongue, and means for locking said wedge in said hole, substantially as described.

3. In an electric generator or motor, the combination, with a field spider, having a solid peripheral rim provided with a series of radial orifices therethrough, of pole pieces having laminated tongues fitting within and passing through said radial orifices and capable of independent insertion and removal, and means inside the rim for locking said tongues in said radial orifices.

4. In an electric generator, or motor, the combination, with a field spider having a solid peripheral rim provided with a series of radial orifices, of pole pieces having laminated tongues fitting within and passing through said radial orifices, wedges fitting within holes in said tongues and having a notch near one end and a plate also fitting within the hole in said tongue and having one end adapted to enter the notch in said wedge and its other end adapted to be bent at an angle to the middle portion of the plate, substantially as described.

5. In an electric generator or motor, the combination, with a field spider having a solid peripheral rim provided with a series of radial orifices therethrough, of pole pieces composed of a series of laminæ seated on said rim, some of the said laminæ being longer than others and forming laminated tongues which fit within and project through the radial orifices in said rim and said projection of said tongues having holes therethrough and wedges fitting within said holes and locking said tongues in said openings.

In witness whereof, I have hereunto set my hand this 14 day of July 1908.

CHARLES TRUMAN HIBBARD.

Witnesses:
RICHARD PAUL,
J. A. BYINGTON.